(12) United States Patent
Gross

(10) Patent No.: US 9,010,317 B1
(45) Date of Patent: Apr. 21, 2015

(54) CLOSED LOOP TRACKING SYSTEM USING SIGNAL BEAM

(75) Inventor: William Gross, Pasadena, CA (US)

(73) Assignee: Idealab, Pasadena, CA (US)

( * ) Notice: Subject to any disclaimer, the term of this patent is extended or adjusted under 35 U.S.C. 154(b) by 1162 days.

(21) Appl. No.: 12/488,447

(22) Filed: Jun. 19, 2009

Related U.S. Application Data

(60) Provisional application No. 61/132,794, filed on Jun. 20, 2008.

(51) Int. Cl.
*F24J 2/38* (2014.01)
*F24J 2/36* (2006.01)
*F24J 2/34* (2006.01)

(52) U.S. Cl.
CPC ..................................... *F24J 2/36* (2013.01)

(58) Field of Classification Search
USPC .................. 126/581, 582, 573, 576, 601; 250/203.4; 353/3
See application file for complete search history.

(56) References Cited

U.S. PATENT DOCUMENTS

| | | | | |
|---|---|---|---|---|
| 4,172,443 A * | 10/1979 | Sommer | ...................... | 126/680 |
| 4,204,881 A * | 5/1980 | McGrew | ...................... | 136/246 |
| 4,382,434 A * | 5/1983 | Meckler | ...................... | 126/603 |
| 4,519,382 A * | 5/1985 | Gerwin | ...................... | 126/578 |
| 4,564,275 A * | 1/1986 | Stone | ...................... | 353/3 |
| 5,160,112 A | 11/1992 | Pritchard et al. | | |
| 6,899,096 B2 * | 5/2005 | Nakamura | ...................... | 126/581 |
| 6,959,993 B2 | 11/2005 | Gross et al. | | |
| 7,192,146 B2 | 3/2007 | Gross et al. | | |
| 2006/0060188 A1 * | 3/2006 | Hickerson | ...................... | 126/680 |
| 2006/0201498 A1 * | 9/2006 | Olsson et al. | ................. | 126/605 |
| 2008/0011288 A1 * | 1/2008 | Olsson | ...................... | 126/576 |
| 2009/0107485 A1 | 4/2009 | Reznik et al. | | |
| 2009/0133685 A1 | 5/2009 | Pham et al. | | |
| 2009/0241938 A1 | 10/2009 | Arbogast et al. | | |
| 2009/0241939 A1 | 10/2009 | Heap et al. | | |
| 2010/0252024 A1 * | 10/2010 | Convery | ...................... | 126/578 |
| 2010/0326424 A1 * | 12/2010 | Bennett | ...................... | 126/600 |

* cited by examiner

*Primary Examiner* — Gregory Huson
*Assistant Examiner* — Nikhil Mashruwala
(74) *Attorney, Agent, or Firm* — Cotman IP Law Group, PLC

(57) ABSTRACT

The invention is a system and method for heliostat mirror control. Here, each heliostat mirror generates a low intensity "signal beam", directed at an angle off from the heliostat mirror's high intensity and sensor blinding "main beam" of reflected solar energy. The low intensity signal beams may be created by reflecting a small portion of the incident solar light at an angle from the main beam, by reflected artificial light, or from lasers shinning onto mirrors from known locations. The signal beams are detected by optical sensors mounted way from the main heliostat receiver focus, and can be used in a closed loop control system to efficiently ensure that individual heliostat mirrors in a heliostat array accurately track sunlight and direct the sunlight to a central receiver. Because heliostat mirrors need not be taken "off sun" for positioning, the system allows heliostat arrays to be run at high efficiency.

20 Claims, 10 Drawing Sheets

US 9,010,317 B1

CLOSED LOOP TRACKING SYSTEM USING SIGNAL BEAM

This application claims the benefit of U.S. Provisional Patent Application 61/132,794, filed Jun. 20, 2008, the specification of which is hereby incorporated herein by reference.

BACKGROUND OF THE INVENTION

1. Field of the Invention

One or more embodiments of the invention are directed to the field of solar tracking systems. More particularly, but not by way of limitation, embodiments of the invention provide systems and methods for keeping an array of heliostat mirrors properly oriented towards a solar receiver.

2. Description of the Related Art

As world oil supplies dwindle, and demand for energy increases, heliostats and other mirror based solar collection devices are becoming a widely utilized method of energy production. A heliostat is a stationary device that tracks the movement of the sun. The heliostat typically contains a mirror that is oriented throughout the day to redirect sunlight towards a receiver. In large-scale solar energy installations, an array of heliostats are arranged to converge the sun's energy onto the receiver. When many heliostats direct sun energy to the same receiver, this receiver is generally referred to as a "central receiver".

These heliostat arrays generally contain many thousands of mirrors, and maintaining alignment of these mirrors over time towards the central receiver is a problem that is regularly encountered. In some solar installations, various types of mirror orientation devices, such as various actuators, control the orientation of the heliostat mirrors. These actuators are generally motion control devices such as motors, servo-mechanisms, clockwork mechanisms, and the like that are configured to control the orientation of the heliostat mirror relative to the sun and the receiver. In some instances the actuators are under the control of one or more computers.

In an ideal scenario, each heliostat within the array is positioned to focus the sun's rays onto a central receiver for purposes of heating the central receiver to extremely high temperatures. In many commercial solar installations, the central receiver generally contains a heat receiving medium, such as water or salt. Once heated, the heated medium travels through a heat exchanger, where the heat is used to create steam. The steam in turn may be used to operate a steam turbine and create electrical energy. Alternatively the concentrated solar heat and light can be used to generate electricity by other processes, or use the concentrated solar heat and light to perform other useful tasks.

Using a larger number of heliostat mirrors in an array, all focused onto the same central receiver, typically improves efficiency because more solar energy can be collected and used by the same receiver. As a result, although heliostat arrays can be created using as little as one heliostat mirror and one receiver, typical heliostat arrays contain many thousands of individual heliostats, often arrayed over several or more acres of land.

One problem that negatively impacts heliostat performance is the problem of directing the reflected sunlight from the various heliostat mirrors onto the same desired region of focus on the central receiver throughout the day, and throughout the year. As the time of day varies and as the time of year varies, the angle of the sun in the sky varies, and thus the heliostat mirrors must be continually be repositioned to keep directing a maximum amount of reflected sunlight onto the central receiver. Given that the heliostat mirrors may be located some distance away from the central receiver, even minor errors in mirror orientation can cause the reflected sunlight to miss the receiver, thereby causing the heliostat array as a whole to function with suboptimal efficiency. Although heliostat mirrors are usually controlled by calibrated actuators, the calibration of the actuators may drift with time, causing pointing inaccuracies.

In theory, the orientation of the main beam of reflected sunlight from a given heliostat mirror onto a central receiver can be detected by simply placing sensors on the central receiver, and monitoring the deviation of any given heliostat's main beam from the ideal location on the central receiver. In practice, however, this simple approach is impractical given that as the number of heliostat mirrors increases, the large amount of light and heat on the central receiver will tend to overwhelm (destroy or blind) any sensors placed near the beam focus.

To cope with this problem, heliostat mirror actuators and control systems can also be partially calibrated by a process of orienting one or more heliostat mirrors to an "off sun" orientation (i.e. the mirrors are not directed at the central receiver), calibrating the heliostat actuators in at least the off sun mode, and then returning the heliostat to the "on sun" orientation. However using the man beam from even one off sun oriented heliostat can be problematic because the high intensity of even one main beam can still tend to overwhelm optical sensors and digital cameras, resulting in lower accuracy, and additionally, the off sun mode of the heliostat is at best a surrogate for the heliostat's setting in the on-sun mode.

For at least the reasons set forth above improved methods for positioning heliostat mirrors are desirable.

BRIEF SUMMARY OF THE INVENTION

One or more embodiments of the invention are directed to a closed loop feedback system and method for heliostat mirror control. Various aspects of the invention are based on the insight that although the solar light energy in the main beam reflected from the heliostats is too intense to allow for a practical closed loop feedback control system, if each heliostat mirror could instead be used in a closed loop control system relying upon a much lower intensity "signal beam" that correlates with the main beam, but is directed to a location other than the central receiver, then the problem of overwhelming the positioning sensors can be avoided.

One or more embodiments of the invention utilize this signal beam concept. Here, various suitable methods of signal beam generation are disclosed, along with various sensor configurations, and methods and algorithms to control the orientation of heliostats and heliostat fields are also given.

This closed loop system is a substantial improvement over prior art methods, because it allows the heliostat array to be run at higher efficiency without the need to take one or more heliostat mirrors to a non-operative "off-sun" location for calibration purposes, and the lower intensity signal coupled with the ability to do the calibration and control in an "on sun mode" allows for higher accuracy.

BRIEF DESCRIPTION OF THE DRAWINGS

The above and other aspects, features and advantages of the invention will be more apparent from the following more particular description thereof, presented in conjunction with the following drawings wherein.

DETAILED DESCRIPTION OF THE INVENTION

Figure 1:
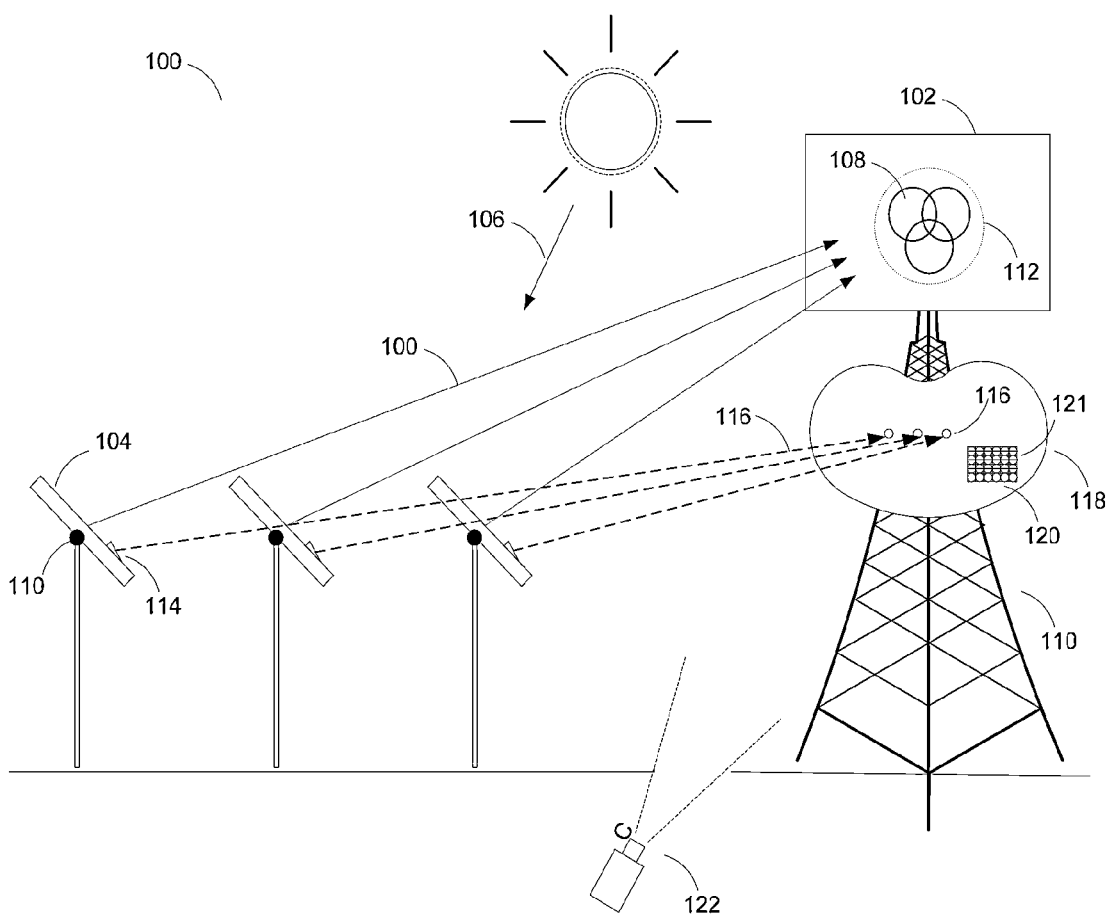
FIG. 1 illustrates an array of heliostats configured in accordance with one or more embodiments of the invention. These heliostats redirect light to a tower-mounted receiver or other target, where the energy is absorbed and converted to steam, electricity, or other usable form.

At the most general level, one or more embodiments of the invention are directed towards a system and method for positioning a heliostat mirror within an array of heliostat mirrors so that a main beam of incident sunlight reflected from said heliostat mirror converges onto a single region of a receiver. The system and method is implemented in accordance with one or more embodiments of the invention as a closed loop feedback system and method, but it can be used in an open loop manner if this is desired. In the following description, numerous specific details are set forth in order to provide a more thorough understanding of embodiments of the invention. It will be apparent, however, to an artisan of ordinary skill that the present invention may be practiced without incorporating all aspects of the specific details described herein. In other instances, specific features, quantities, or measurements well known to those of ordinary skill in the art have not been described in detail so as not to obscure the invention. Readers should note that although examples of the invention are set forth herein, the claims, and the full scope of any equivalents, are what define one or more embodiments of the invention.

In one or more embodiments of the invention, the heliostat mirror is induced to emit or reflect a low intensity signal beam to one or more sensors, usually optical sensors, photodetectors, digital cameras, and the like, placed in a location outside of the receiver. In order to allow the sensors to be operated at a location other than the receiver location (which typically will be operating under conditions of heat and light that would destroy the sensors), the low intensity signal beam will be concurrent and/or simultaneous with the main beam, but offset from the main beam. That is the signal beam will be directed at or observable from an angle offset from that of the main beam.

In order for aspects of the invention to operate, for each heliostat, there is a known relationship between the angle of the heliostat's low intensity signal beam, and the angle of the heliostat's main beam. This relationship is generally determined by a calibration process but may be predefined. Once the calibration is determined, the low intensity signal beam on the one or more optical sensors can be used to determine if the heliostat mirror is positioned properly. That is, so that a main beam of the incident sunlight reflected from the heliostat mirror converges onto the desired region of a receiver. This desired region of the receiver may be a single region on the receiver, and the heliostat beams are ideally calibrated to converge on this single point. Alternatively the desired region of the receiver may be the region allocated to a particular heliostat or group of heliostats, with different heliostats illuminating different regions of the receiver in order to heat the receiver more uniformly or from different orientations.

There are a number of different ways to cause or induce a heliostat mirror to emit a suitable low intensity signal beam. In one or more embodiments of the invention, sunlight is used in conjunction with supplementary optical elements (e.g. small angled mirrors) mounted or coupled to the heliostat mirror, that cause the sunlight to produce a low intensity signal beam at an angle that diverges from the main beam. Other approaches are also feasible. In other embodiments of the invention, the heliostat mirrors may be illuminated with artificial light from an angle other than the sun incident angle, and the reflected artificial light may be used as a low intensity signal beam. Alternatively or in addition, collimated light sources, such as low intensity diode lasers, may be shinning onto the heliostat mirrors from known locations, and the emitted artificial light reflection used as a low intensity signal beam.

In one or more embodiments of the invention, the low intensity beam is created using sunlight, and supplementary optical elements mounted on or adjacent to the heliostat mirrors, is described. Many of the systems and methods here, in particular the sensor closed loop feedback system and methods, may also be used for the other embodiments of the invention as well. Thus the aspects described here are not limited solely for use within this embodiment of the invention.

FIG. 1 shows an array of heliostats (100) configured to redirect sun light to a tower-mounted receiver (102) or other target where the energy is absorbed and converted to steam, electricity, or other usable form. The heliostats in the one or more embodiments of the invention include one or more mirrors (104) that receive incident sun light (106) and reflect the majority of the sun light to the receiver (102). The orientation of the mirrors (104) is dynamically updated with actuators (110) to account for the movement of the sun over the course of the day. A beam of light (108) reflected from a heliostat mirror to the receiver is referred to herein as a "main beam." To capture the maximal amount of energy from the heliostats and convert that energy efficiently, it may be desirable for the main beams from each of the heliostats to converge on a single region (112) of the receiver (102), also called the convergence point. This requires that the orientation of mirrors (104) be precisely known and periodically calibrated to ensure the heliostats track the sun and their main beams continually focus light on the receiver (102). In accordance with this exemplary embodiment, a plurality of the heliostat mirrors also include relatively small optical elements (114) that redirect a relatively small fraction (116) of the incident light (106) to an array of digital cameras (120) on target (118) for purposes of precisely determining the orientation of the heliostat mirrors. A small optical element (114) is referred to herein as a "signal mirror," and a small beam of light (116) reflected from one of the small optical elements is referred to herein as a "signal beam."

In this exemplary embodiment, the signal mirror (114) is a small facet of mirror mounted on or otherwise incorporated into a substantially planar heliostat mirror (104). The signal mirror (114) can either be attached to the main mirror and thus obscure a small portion of the main mirror and/or be mounted adjacent to the main mirror (but coupled to the main mirror), and thus not obscure the main mirror. The normal vector that characterizes the orientation of the signal mirror is different than the normal vector associated with the heliostat, thereby making the main beam (108) and the signal beam (116) diverge from one another as they propagate from the heliostat (104). The main beam (108) is generally incident on the receiver (102) while the signaling beam (116) is concurrently incident on a "signal beam target" (118) that is below, above, or adjacent to the receiver (102). In one or more embodiments of the invention, the signal beam target (118) contains one or more digital cameras (120) (here the terms digital camera and digital video camera will be used interchangeably, because often it will be desirable to acquire digital images at frequent time intervals) that are oriented toward the array of heliostats. The cameras generate output images from which the signal beams (116) are detected and the heliostat mirror orientations computed. The computed mirror orientation information is then used as a closed-loop feedback signal to determine if the heliostats are tracking the sun and accurately aiming main beams on to the receiver (102).

Note that the invention may also use optical sensors and image capture devices. The term optical sensor encompasses digital cameras, but also includes non-image detecting photodetectors as well, such as an array of photodetectors that may not necessarily use focusing lenses and or focusing mirrors. Similarly the term optical sensor also encompasses image detection devices as well. Such image detection devices also encompass digital cameras, but may also encompass analog video cameras and even cameras that utilize chemically based film methods.

Figure 4A:
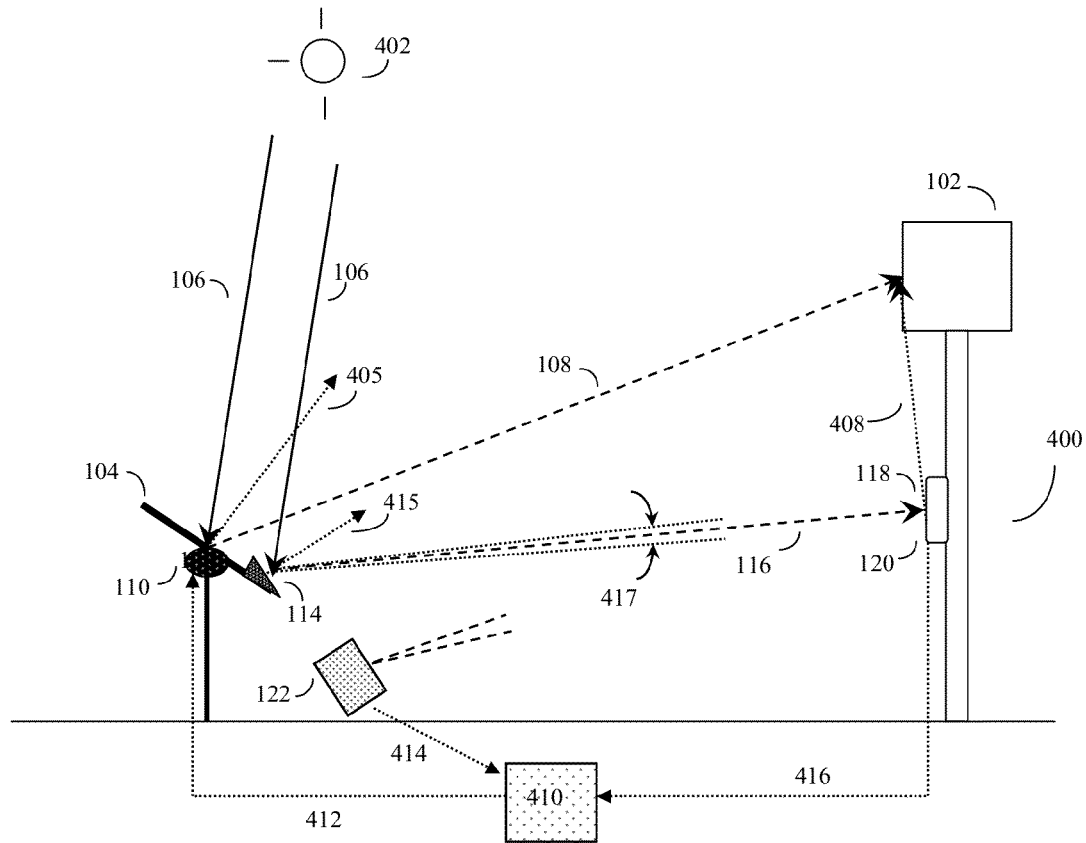
FIGS. 4a-c illustrates more details of how the relationship between the signaling beams and the main beams may be determined in accordance with one or more embodiments of the invention, and used in an automated closed-loop system to properly orient heliostat mirrors.

The further away the digital cameras (120) (which often may be a digital camera array) are from the signal mirror (114), the greater the sun spread (Illustrated in FIG. 4a (417)) will be. That is, different digital cameras (120) at different positions on target (118) will detect the signal beam (116) from a given signal mirror (114) to a greater or lesser extent, depending upon how close the particular digital camera is to the centroid or point of highest intensity of the particular signal beam (116). Referring now to FIG. 4c which illustrates that different cameras may sample different lux levels from the same signal beam that is reflected from the signal mirror. The gradation in the intensity of the signal beam is directly correlated to the distance the signal beam target is from the signal mirror. At a point closest to the signal mirror (420) the reflected light is clearly delineated from the natural sunlight. As the distance from the signal mirror (420) increases the lux levels of the reflected light begins to have a diffuse edge that results from the sun spread (417). At point 422, for example, the reflected light has a diffuse edge but retains an even level of intensity throughout the center point of the reflected light. Further from the signal mirror at point 424 the point of highest intensity in the reflected light is more isolated at an apex (426). In embodiments of the invention where a plurality of digital cameras (427, 428, 429 and 430) capture the signal beam reflected from the signal mirror, each camera may obtain a different intensity level for the same signal beam. When this occurs digital image analysis is employed to compare different images and sample the intensity of reflected light (424). In the example depicted, digital camera 427 samples at point A, digital camera 428 samples at point B, digital camera 429 samples at point C and digital camera 430 samples at point D. The intensity information obtained from the sampling is then utilized to observe or determine centroid 426 which is indicative of the point of highest intensity in the signal beam. The camera or cameras closest to 426 are then utilized to determine positioning of the heliostat.

Note that the drawing of the digital cameras (120) shows an array of different cameras (121) separated by a distance between the digital cameras. In one or more embodiments of the invention, it may be useful to use digital image analysis to compare different images of the signal mirrors (114) from different digital cameras (121) in array (120), determine which particular digital camera is closest to the centroid of a particular signal mirror (114), and compute the signal beam (FIG. 4c (424)) distribution across multiple digital cameras (121). The signal beam distribution (FIG. 4a, (417)) and/or the location of possible edges in the signal beam can then be utilized in subsequent analysis. The size of the signal mirror and distance from the receiver dictate how many cameras are needed on the signal beam target to make sure that centroid for each signal beam is observed.

One useful distribution of cameras (120) in the array of cameras is a distribution with cameras placed apart at distances equal to about half of the signal beam sun-spread or signal beam divergence. Thus in one or more embodiments of the invention, multiple cameras will look at the signal beam, deduce the center of the signal beam, evaluate the signal beam spread, and factor in the size of the signal mirror and the distance to the signal mirror in the analysis.

In one or more embodiments of the invention the system uses multiple cameras or sensors (120) to analyze the distribution of the signal beam as a function of distance geometry (i.e. camera position) and time (i.e. when the camera image was acquired). This is because the angle of the sun in the sky varies as a known function of time, and this can provide additional information to help calculate exactly which signal mirror is producing a particular signal beam. For example, geometric considerations show that mirrors closer to the cameras (120) will produce signal beams with generally smaller spread (FIG. 4, (417)) that vary slower as a function of time, while mirrors further from cameras (120) will produce signal beams with a generally broader spread that may vary more rapidly as a function of time.

The shape of the signal beam target (118) and digital camera array (120) may vary depending on the layout of the heliostat field. The shape of the signal beam target (118) is such that it provides a region upon which each heliostat within the array of heliostats will reflect its signal beam onto the signal beam target throughout the day so long as the main beam is aligned with the receiver. While the shape will vary depending on the layout of the heliostat array it is advantageous to use a size that permits the mirrors furthest out in the field to reach the signal beam target when properly aligned as well as the mirrors closest to the receiver. Since the signal beams will travel across different positions on the signal beam target throughout the day as the angle of the sun changes the size of the signal beam target needs to be large enough to account for such movement throughout the day and throughout the seasons. In one or more embodiments of the invention the signal beam target is given a shape that resembles a "kidney bean" in order to accommodate the distribution of heliostat mirrors in many typical heliostat arrays. Other shapes are also well within the scope and spirit of the invention as any shape that provides a surface area large enough to receive the reflected signal beams will suffice.

Figure 2:
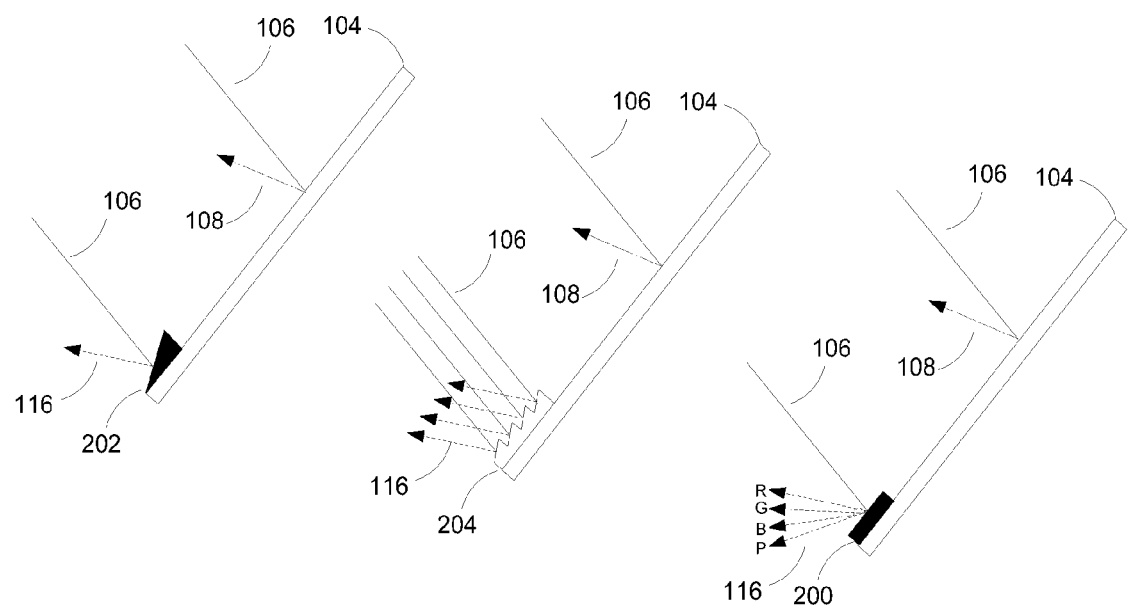
FIG. 2 illustrates how various types of "signaling mirrors" may be positioned in accordance with one or more embodiments of the invention on the main heliostat mirror to generate a low intensity signal beam at an angle different from that of the main beam.

As depicted in FIG. 2, the "signaling mirror" (114) encompasses a variety of light reflecting, light refracting, and light dispersal elements, and thus can be implemented in various ways. In addition to the signaling mirror (114) previously discussed in FIG. 1, the optical element can include a small prism (not shown) (having an angle of approximately 1 degree or any other suitable angle for achieving the desired effect) that is mounted to the heliostat mirror. The signal mirror may also be concave or convex depending upon the level of diffusion or focus desired at the signal beam target. If desired for purposes of focusing the spread of the signal beam lens elements may be part of the signaling mirror. A diffraction grating (200) may also be employed as an optical element, in which case the signal beam (116) may be spread over a range of angles and wavelengths, which may facilitate precise determinations of mirror angles. The diffraction grating spreads out the reflected light periodically over a broader angle than other embodiments that decays in intensity as the reflection moves off axis. Given that the reflected light from the diffraction grating is broader than a prism or mirror this embodiments enables the digital camera to pickup variations in color or intensity that enables repositioning of the heliostat mirror across a broader range of angles than other embodiments. Another exemplary optical element includes a small mirror facet (202) mounted on top of a wedge, the faces of the wedge being separated by about 1 degree or any other angle suitable for achieving the desired effect. In still other embodiments, the optical element includes a Fresnel lens (204)/mirror combination, or alternatively a signal mirror with slight curvature in its surface to better control the dispersion of the signal beam, and allow it to arrive at target (118) and digital cameras (120) with less dispersion and/or tighter focus. The width and height of an optical element (114), (200), (202), 204) is generally substantially less than that of the main heliostat mirror, typically less than ⅟₅₀ of the heliostat mirror area, and often no more than two or three inches in diameter (5-8 cm). This is substantially smaller than the heliostat mirror (104) area of one or more square meters. Alternative signal beam offset degrees and signaling mirror diameters may be utilized while keeping with the spirit of the invention set forth herein. The larger the signal beam mirror the more light The exact angle of the offset between the signal beam from the signal mirror and the main beam from the main mirror will differ depending upon the layout of the heliostat field and the optical sensors. In some configurations, where the target (118) and digital cameras (120) are mounted close to the receiver (102), then a narrow offset, such as between ¼degree and 3 degrees may be suitable. In other configurations, where the target (118) and digital cameras are mounted far away from the receiver (102), then more substantial offsets, up to 180 degrees, may be appropriate. In principle, (for example if the signaling mirror (114) is a prism), the target (118) and digital cameras (120) could even be mounted on the other side of the heliostat field. As such any variation in the angle of offset that provides the desired effect is within the scope and spirit of the invention.

The position/orientation of the signal beam (116) is fixed or otherwise correlated to the main beam (108) due to the fixed relationship between the signal mirror (114) and the heliostat mirror (114). For any given incident light angle (106), the exact angle between the two beams (108), (116) can be determined using, for example, a jig or a process that puts each main beam on the main beam target (i.e., receiver) (102) and then locates the signal beam (116) on the signal beam target (118). The displacement of the two beams (108), (116) will vary based on the time of day and the time of year, but this variation can be computed or retrieved from a sun position table, for example. Once the relative position of the main beam (108) and the signal beam (116) are known, the signal beam's position (116) can be used as part of the closed loop feedback tracking scheme of the present invention.

Returning to FIG. 1, in one or more embodiments of the invention, the resolution of the digital cameras (120) is sufficient to resolve the signal beams as separate light sources. Although some contemporary tracking techniques employ digital cameras to calculate the orientation of the heliostat mirrors, the cameras in these prior art approaches attempt to concurrently sense the main beams (108) of multiple heliostats. Light spots from the different main beams are extremely bright and overlap one another, which can present a challenge when attempting to make accurate angular orientation determinations. In one or more embodiments of the invention, the signal beams (116) are more suitable for closed-loop tracking due to their relatively small size and low light level.

During operation of the solar thermal power plant described herein, the cameras (120) incorporated into the signal beam target (118) continually or periodically capture images from which the orientation of the heliostat mirrors (104) are determined. The image data is processed to identify signal beams (116) from background noise, identify the heliostat mirrors (104) associated with individual signal mirrors (114), and determine the orientation of each heliostat based on the location of the signal beam (116) on the target (118). There are multiple ways that the signal beams (116) can be identified. They can, for example, be identified by having a cluster of cameras (120) look out at all the beams, and the cameras can tell which beam it is viewing by its angle or position in the field. The signal beams can also be identified by having other sensors within or at the second target (118). The signal beams can also be identified by having a camera or other sensor (122) looking at the target.

Figure 3:
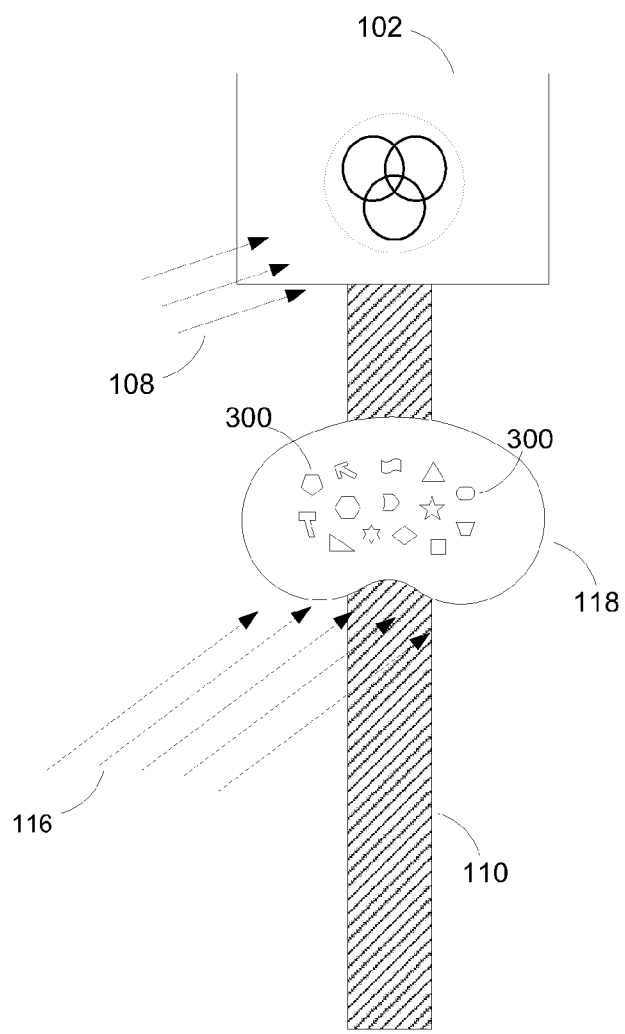
FIG. 3 illustrates one way in which signaling beams from different heliostat mirrors may be distinguished from each other in accordance with one or more embodiments of the invention. Although here, for ease of visualization, each signaling mirror is shown generating a different geometric shape, in practice other distinguishing methods, such as blinking, shutters, or other optical signal modulation methods, may be used.

FIG. 3 illustrates a detail of the signal beams (116) impinging upon the target (118). To distinguish which signal beam (116), and thus, which heliostat mirror (104), (114) is being observed when there are many beams at once, the signal beams (116) can either each have different shapes (300) (encoded into the mirror or prism or diffraction grating creating that signal beam) or the signal beams can be encoded by blinking or darkening all or single signal beams (116) at a time. This can be done with a shutter, either electrical or mechanical, or via another mechanism to momentarily redirect or turn off a signal beam or group of signal beams so that it is clear to distinguish what signal beam corresponds to what heliostat mirror. Other mechanisms may include signal mirror (114) vibration mechanisms, such as piezoelectric or electromagnetic vibration mechanisms, and so on.

The shutter or electrical or mechanical mechanisms may be positioned in one or more embodiments of the invention near the optical element (114), (202), (204), (200). Other ways in which the signal beam may be modulated (signal beam modulation) include vibration at one or more defined frequencies or amplitudes, polarization changes, and the like. In some embodiments, it may be useful to impress a digital code signal onto the signal beam (116) that directly encodes the identification number of the individual heliostat onto the signal beam. Varying colors may also be assigned to each signal beam in order to facilitate the unique identification of each signal beam.

Once the heliostat mirror (104) associated with a signal beam (116) is identified, the orientation (and/or position) of the heliostat mirror can be adjusted (for example via actuators (110)) to drive the signal beam (116) to the correct position in order to get the main beam (108) in the desired position (112). That position could be either at the center of the target (102), (112), or other select position to achieve the optimum flux profile or light profile.

An advantage of one or more embodiments of the invention is that it permits the light of the main beams (108) to stay on target without having to take those main beams off sun or off their target to determine the direction in which they are pointing. This is made possible by the correlation between the locations of the signal beam (116) and the main beam (108).

Figure 4B:
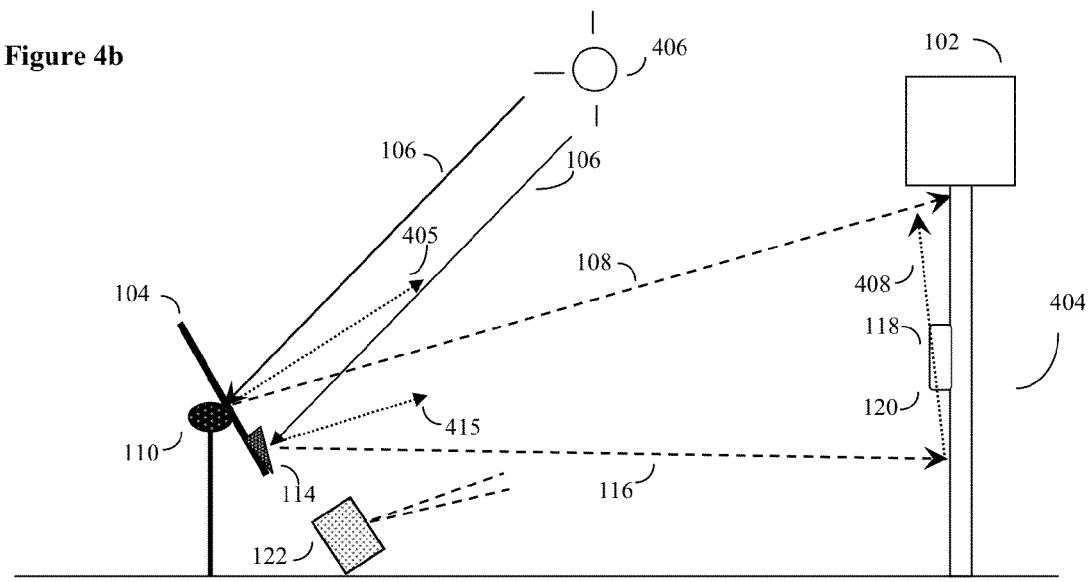
Figure 4C:
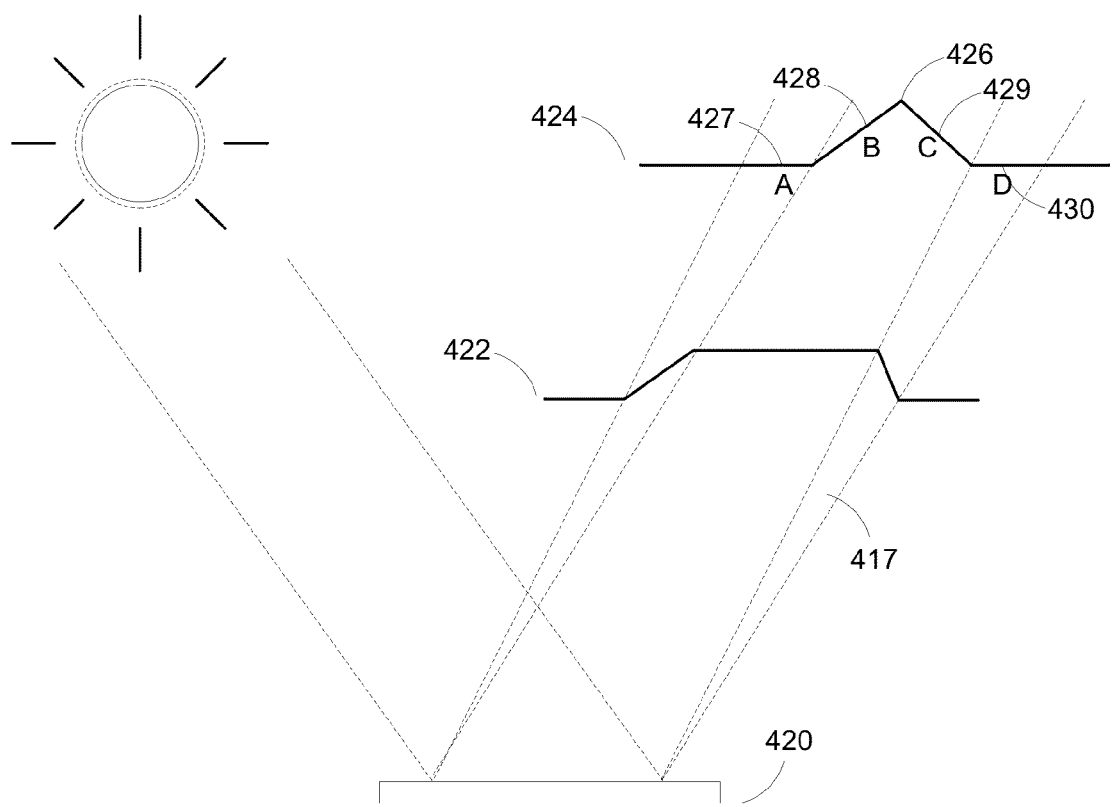

An example of some of the calculations involved in one or more embodiments of the invention are depicted in FIG. 4A-B. The top part of FIG. 4A (400) shows a properly oriented heliostat mirror (104) at a first sun angle (402), and the bottom part of FIG. 4B (404) shows an improperly oriented heliostat mirror (104) at a different sun angle (406).

Each individual heliostat mirror (104) is capable, when properly oriented (400), of receiving incident sunlight from a sun incident vector (106) and reflecting the majority of the sunlight (402) outward at a desired main beam (108) to a receiver (102). Note however that when the heliostat mirrors (104) are improperly oriented (404), the majority of the sunlight (406) will be reflected outward along a non-desired main beam (108) to a non-desired location or target.

The method used in accordance with one or more embodiments of the invention involves rigidly connecting at least one optical element (114) to the individual heliostat mirrors (104), where again each optical element (114) produces a signal beam of light (116) directed outward from the individual heliostat mirror (104). Note that here, regardless of the type of optical element used (e.g. elements (114), (202), (204), (200), or other), the optical element operates by taking the incident sunlight (106) as an input and then producing signal beam light (116) as an output.

Assuming specular reflection, which is normally the case for heliostat mirrors, then the normal vector to the heliostat mirror surface is (405), and the angle of the incident sunlight (106) relative to the normal vector (405) is equal to the angle of reflection of the main beam (108) relative to the normal vector (405). However for the optical element (114), the angle of the normal vector (415) to its surface will typically be different from the angle of the normal vector to the heliostat mirror (405) by about a degree. That is, if the angle of normal vector (405) is 45 degrees, then the angle of normal vector (415) may be about 46 degrees. As a result, the angle of incidence of the sunlight (106) onto the optical element will differ by about a degree, and using the rule that the angle of incidence is equal to the angle of reflection, then the angle of the signal beam (116) will differ from the angle of the main beam (108), resulting in the signal beam being directed at signal beam target (118) at a different angle.

For these methods, the relative spatial locations or geometry of the heliostat mirrors (104), the receiver (102), and the target (118) or cameras (120) is also important.

The further away the receiver (102) and target (118) is from the heliostat, the greater the offset is between the signal beam (116) and the main beam (108). To illustrate this point, it is convenient to view the situation in terms of standard physics vectors, where the main beam (108) can be considered as a vector, and the signal beam (116) can also be considered as a "tracking" vector.

The signal beam or tracking vector (116) can be viewed as being related or offset from the main beam vector (108) by a correction vector (408). This correction vector differs according to the distance between the heliostat (104) and the receiver (102) and target (118), as well as the sun angle and the offset between the signal mirror (114) and the heliostat main mirror (104). A calibration process, such as one using the previously mentioned jigs, can normally determine this offset. Other calculations, to be described, are required in order to determine the correction vector for each individual heliostat mirror and signal mirror combination.

In one or more aspects of the invention, at least one optical sensor (120) or (122) is also positioned in or near the array of heliostat mirrors, and this at least one optical sensor is used to detect the signal beam of light (116) and determine the tracking vector (116). In at least one configuration, the signal beam of light (116) impinges on a reference surface, such as the target (118), and the optical sensor can simply be an optical camera or digital camera (122) set to observe this reference surface (118). In other configurations, as previously described, the signal beam of light (116) may directly impact on an array of optical sensors or digital cameras (120) positioned at the target (118). Here the individual heliostat mirrors (104) and their associated signal beams (116) may be distinguished from each other using the previously discussed signal beam modulation methods.

In either case, the signal from the optical sensor or sensors (120) or (122) can, with the aid of a digital computer or computer processing system (410), be used, in conjunction with the previously determined offset, to determine the correction vector (408). This in turn can be used to compute the main beam vector (108), and determine if the main beam (108) is hitting the target (102) properly or not. As previously discussed, often the digital image signals from multiple optical sensors or digital cameras (120) may be analyzed in order to compensate for signal beam spread or "sun spread" (417) that may occur as the signal beam travels from the heliostat to the optical sensor (120).

A key variable in these computations is the position of the sun (402), (406) which varies according to both time of day and the day of the year. The position of the sun also varies according to latitude as well, but here latitude will be constant for any given heliostat array, so these effects can be simply compensated for through a latitude offset.

Thus to determine the optimum angle to set the heliostat actuators (110) in order to have the main beam (108) hit the target (102), (112), a computer processor (410) controlling the actuator (110), by a network or communications line (412) will perform a computational process. This process will typically use the laws of reflection (e.g. angle of incidence is equal to the angle of reflection). As well as the known geometry of the heliostat (104) and the receiver (102). Here the angle of the incident sunlight, or sun incident vector (106) is a known factor that can be calculated from the time of day, day of the year, and latitude. Alternatively, the angle of the incident sunlight or sun incident vector (106) can be determined directly by a sun angle sensor, such as an optical device that directly measures the angle of the sun without further need for time of day or day of year or latitude calculations.

The present orientation of the heliostat mirror can be computed from the optical sensor data ((120), (122) communicated by network or communications line (414) or (416)) to the computer (410); and the previously determined offset, and used to compute a correction vector (408). The relative locations and geometry of the heliostat mirror (104) relative to the target (102) will usually also be previously determined and entered into the computer system. Alternatively, these relatively complex calculations can be pre-computed and stored in a computer system as a lookup table or function. These methods may also be done manually, if desired.

In practice, since the layout of the heliostat field, the offset calibration of the individual heliostat optical elements (114), and the position of the sun in the sky at any given day and time can be determined in advance, these calculations can also be made in advance if necessary, and a multidimensional table of what the ideal signal beam position is for any given heliostat in the field is at a given time and date can be generated. This multidimensional table may also contain a series of heliostat actuator (110) correction values that may be sent to the actuator in the event that the signal beam is falling into various non-ideal values. Other methods, such as real-time physics calculations, functions, and the like may also be used.

Regardless of calculation methods, the calculations make use of a table or algorithm that takes heliostat identification number, time, date (or observed sun angle), and observed (actual) signal beam location as inputs, and produces heliostat actuator (110) correction values as outputs.

Thus using the data obtained from one or more embodiments of the invention, standard geometrical optics considerations, the previously entered layout of the heliostat field, the previously entered offset data, and sun angle sensor data, or sun tables or functions showing the sun angle (106) (402), (406) at any given day and time; typically the computer system (410) can then perform the suitable geometric optics calculations and determine the heliostat actuator setting (110) that will optimally focus the main beam (108) onto the target (102), as shown in (400). If the heliostat is oriented at an improper angle (404), the optical sensors (122), (120) will detect this improper angle, feed the data to the computer system or processor (410), and the processor will send a notification to an operator for manual adjustment or a corrective signal to the heliostat actuator (110) via a network, communications line, wireless signal, or other communications means (412). The previously discussed signal beam spread is shown in (417), and in some embodiments, the computer system or processor (410) will take images from multiple cameras and further refine its calculations by computing the centroid and/or edges of the signal beam spread (417).

Using these methods, an entire heliostat array may be calibrated and readjusted as often as desired, or indeed on a nearly continual basis throughout the day, thus insuring that the heliostat array is always functioning with peak efficiency. Note that using these methods, there is essentially no "off sun" time for any heliostat because minor heliostat tracking errors can be caught early and quickly adjusted before any significant loss in efficiency occurs.

Figure 5:
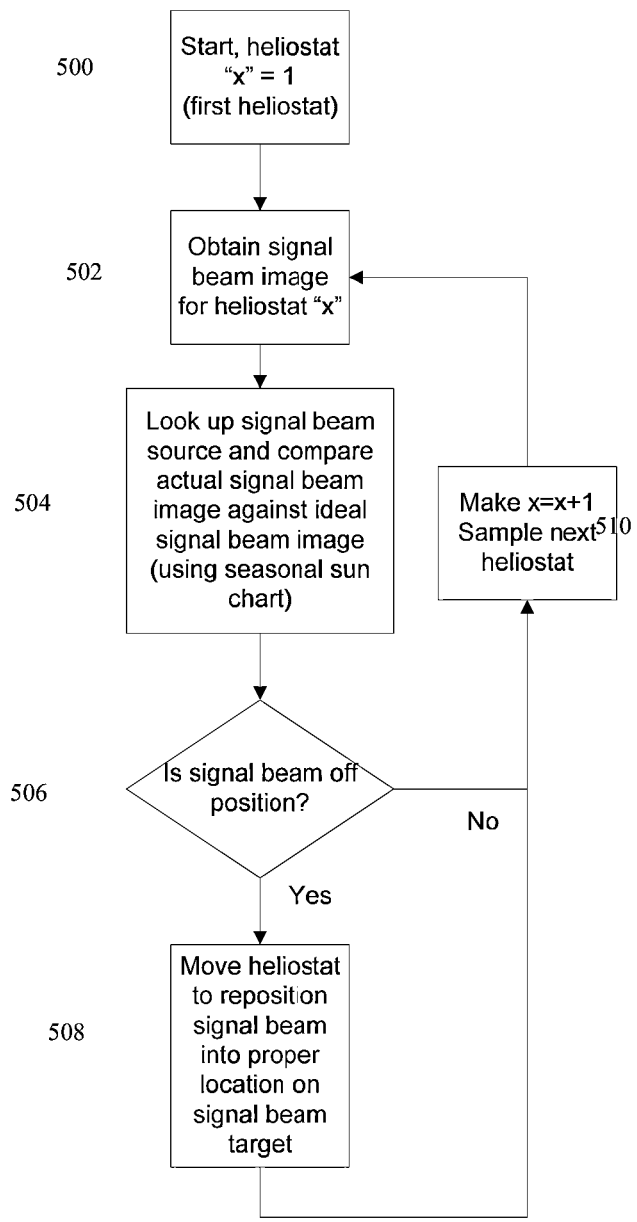
FIG. 5 illustrates an example of a closed-loop algorithm used in accordance with one or more embodiments of the invention to properly orient an array of individual heliostat mirrors on a one-heliostat mirror at a time basis.

An example of a suitable computer or processor controlled heliostat correction algorithm for a heliostat array is shown in FIG. 5. This is essentially a repeating loop that individually calibrates each heliostat in the array, and then repeats this calibration process at the desired frequency. In this example, the heliostat array calibration is assumed to start at heliostat mirror 1, and continue for every numbered heliostat mirror "x" until all heliostat mirrors are calibrated, and then terminate or repeat as desired. (The algorithm termination conditions are not shown, and in practice, in one or more embodiments, when the last heliostat in the field is calibrated, the process could simply begin again at heliostat mirror 1.) Alternatively heliostat mirrors known to be more problematic could be given higher priority. Many other schemes (daily calibration, weekly calibration) are also possible and within the scope and spirit of the invention.

In this example, the process starts at the first heliostat (500), when the open loop feedback algorithm is initialized. Next, in step (502), for each actuator controlled heliostat, the signal beam (116) for the heliostat is measured by the optical sensors (120), (122) and this data is fed into the computer or processor (410). The individual heliostat beams may optionally be distinguished from each other using the previously discussed signal beam modulation methods. Once the signal beam from a particular heliostat "x", with a known location in the heliostat field, is detected, the system then compares the actual heliostat signal beam image versus the table or function of ideal heliostat settings for that particular heliostat, day, and time (504), and determines (506) if the signal beam is off of position. If the signal beam is off position, the computer or processor system (410) then computes the proper heliostat actuator setting to send to that particular heliostat's actuator (110), and then sends the signal to the actuator via network or communications means (412) (508). Regardless of if that particular heliostat's actuator needs correction or not, once this determination is made and usually the correction then done, the system will then typically go on to measure and adjust the next heliostat in the heliostat field (510).

Although implementing this closed loop tracking system and process by one or more computers or processors (410) will generally be quicker and more convenient, in principle the entire process can be accomplished by purely manual methods. For example, human operators can determine signal beam (116) angles and vectors, consult a reference table or book, and then manually adjust the orientation of the individual heliostat mirrors. In this case, human eyes can take the place of optical sensors (120), (122), and humans can also take the place of the computer and network or communications systems (410), (412), (416).

Other Embodiments

As previously discussed, although the signal beam can conveniently be produced using sunlight as a source, this is not the only way to produce signal beams. In alternative embodiments, the entire heliostat mirror, if desired, can be induced to produce signal beams using artificial light sources, and the use of signal mirrors is not necessary. Note that particularly when artificial light sources are used, this light need not always be optical light observable by the human eye. Alternatively other light frequencies, such as near infrared light, far infrared light, or even ultraviolet light, may be used. If light not observable by the human eye is used, it may be preferable to use an artificial light source with a wavelength chosen to better distinguish the artificial light wavelengths from the wavelengths of sunlight, the blue sky, and/or from the background thermal wavelengths of the heliostat and heliostat array. One useful way to do this is to use an extremely bright, short duration, artificial light source, such as a strobe light or other high intensity light source. An additional advantage of the strobe light effect is that the timing of the strobe lights can be chosen, for example by a computer system, to uniquely identify each individual light source as well. That is, light source 1 can always trigger at time 1, light source 2 can always trigger at time 2, and so on.

Figure 6:
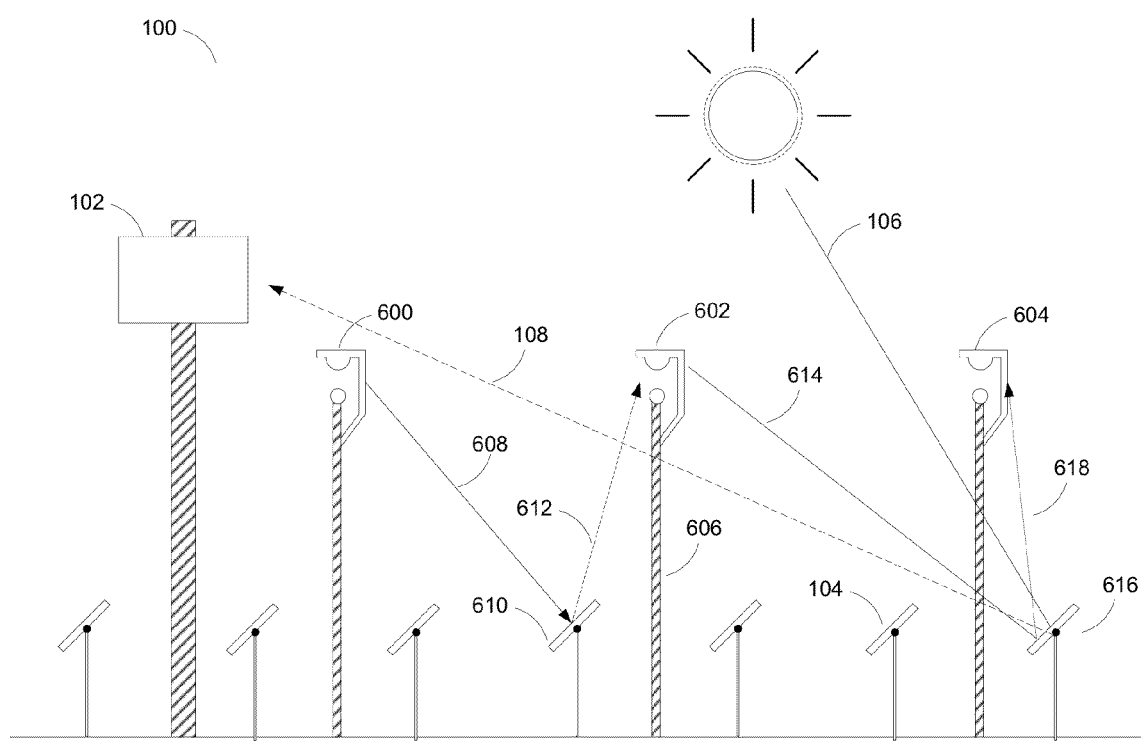
FIG. 6 illustrates an embodiment of the invention in which the signal beams are produced by one or more artificial light sources.

FIG. 6 shows an example of this artificial light source embodiment. In this example a number of artificial light sources and digital cameras (600), (602), (604) are mounted on elevated poles (606) at various locations in a heliostat array (100). In particular, note that artificial light (608) from light source/digital camera source (600) is reflecting off of the entire heliostat mirror (610) and this resulting low intensity signal beam (612) is being detected by the camera on light source/camera unit (602). Similarly artificial light (614) from artificial light source/digital camera (602) is reflecting off of heliostat mirror (616) and this resulting low intensity signal beam (618) is being detected by the light source/camera unit (604). These artificial light sources will often be light emitting diodes, incandescent light sources, fluorescent light sources, and the like. Although collimated artificial light sources such as lasers may be used, omni-directional light sources are also suitable for this embodiment.

If lasers are used, it may be useful to position the lasers in a known location and scan the lasers across the heliostat field while keeping track of the precise angle of the laser during the scan. This scanning method can help the system precisely distinguish which heliostat is being illuminated at any given time, because typically only one heliostat will be illuminated at each particular laser angle. In this case, this additional information may help reduce costs and system complexity because fewer optical sensors or digital cameras may then be needed. The location of the laser on the heliostat mirror is utilized to determine if the mirror is properly aligned.

In one embodiment of the invention multiple light sources, suitably modulated as necessary with digital codes, frequency codes, strobe timing, and the like to identify the pole of origin, are impinging on multiple heliostat mirrors from multiple poles, and being observed from multiple camera angles. As a result, using suitable geometric optical considerations (i.e. location of the elevated pole light source/sensors in the field, location of the heliostat mirrors in the field), the precise orientation of the heliostat mirrors may be determined. In turn, since the sun angle can be precisely determined either by direct measurement from sun angle sensors, or from time of day, day of year, and latitude data, once the present angle of the heliostat mirror is determined, and once the sun angle is determined, then the system can determine how best to orient the heliostat mirror in order to have the main heliostat beam (108) hit the receiver (102) in the desired location. Usually the closed loop method and system will use a computerized control such as computer (410) connected to sensors (600), (602), (604), and controlling the heliostat actuators (110) (not shown in FIG. 6).

The actual distribution of optical sensors and light sources may vary as a function of latitude. In northern hemispheres, typically the sun will be shining from the south, and the heliostat mirrors in turn will tend to be oriented towards the south, and the distribution of optical sensors and light sources can be set to be optimized for that region of the sky where the sun spends most of the time. In the southern hemisphere, the opposite distribution will apply. To reduce costs, the distribution of optical sensors and light sources can also be optimized to concentrate on heliostat mirror positions when the sun is at the angles most likely to be used during peak hours of power production, and the numbers of cameras covering less optimal sun angles can be deemphasized.

Although just sensing the presence or absence of a particular artificial light source in a heliostat mirror, given suitable light source/camera geometry, is generally adequate to determine mirror position to within about one degree of accuracy, by using the digital camera to determine exactly where in the particular heliostat mirror (note that signal mirrors are not needed in this embodiment, and thus the entire heliostat mirror is available for scanning) the light source is observed (usually the light source will look like a point of light originating from some (x,y) Cartesian coordinate in the mirror), a much higher degree of accuracy may be obtained.

In this higher accuracy approach, camera sensors (in this example mounted on (600), (602), (604) should have an optical system and a CCD or other photodetection array with enough resolution to visualize the various heliostat mirrors in their field of responsibility as an image that is spread over a fair number of camera pixels. Usually at minimum, the image of a heliostat of interest will be spread over at least a 10 pixel by 10 pixel area, and the image of the heliostat of interest will be preferably spread over a higher level of resolution, such as a 50 pixel by 50 pixel area or more.

In this higher resolution scheme, the image of a light source of interest, such as (602), will be visualized as a small pinpoint of light located in a particular heliostat (x, y) coordinate.

Figure 7:
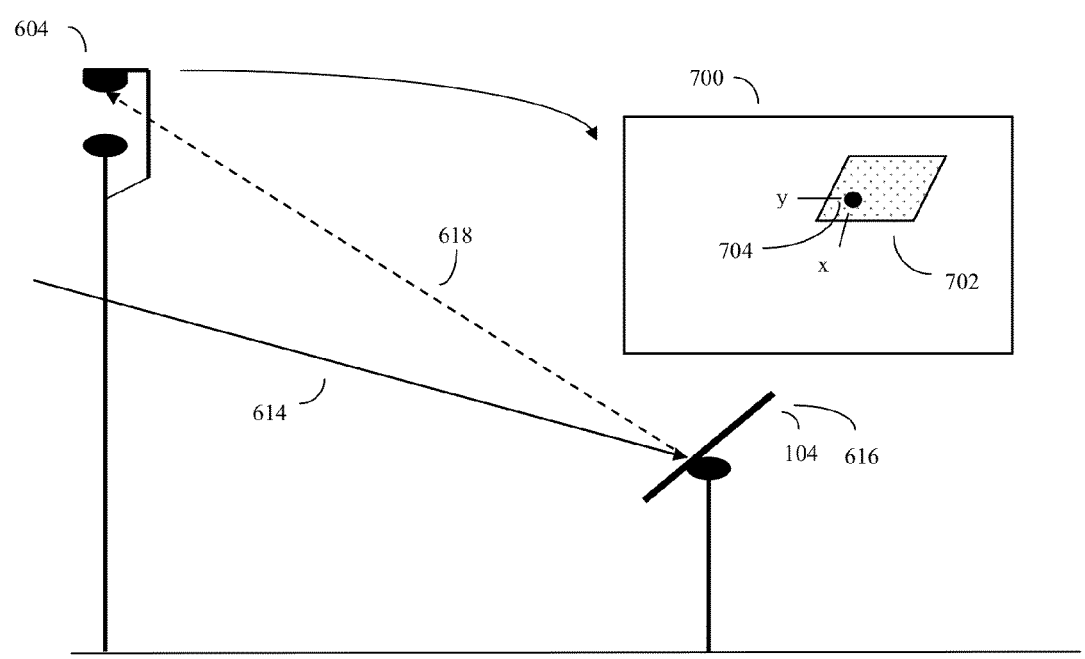
FIG. 7 illustrates an embodiment of the invention, in which digital cameras map the (x,y) coordinates of the reflected artificial light sources in the heliostat Cartesian coordinate system, thus achieving almost a 100× accuracy improvement in angular determination.

This is shown in more detail in FIG. 7, which essentially is a close up of part of FIG. 6. Here a heliostat mirror (104), (616) is being illuminated from an artificial light source (614) from pole (602) (not shown), and the low intensity signal beam (618) is detected by the light source/camera unit (604).

Inset (700) shows a portion of the field of view of the digital camera on pole (604). Here the digital camera will typically image multiple heliostats, including the heliostat of interest, heliostat 616. The image of the heliostat mirror (616), as seen by the digital camera, is shown as (702). As can be seen, the image of the artificial light source (614) is shown as a bright spot or pinpoint of light localized to a particular (x,y) coordinate on heliostat mirror (616). This is shown as (704).

This method of using the pixels of the camera to determine the relative heliostat mirror (x, y) position of the reflected artificial light provides a large amount of additional high precision angular information. As for the other methods, this heliostat mirror angular information data is then correlated with the sun tracking information, and used to determine the position of the mirror at that moment.

In one example, a heliostat array of thousands of mirrors may be calibrated and adjusted using a system composed of sixty artificial lights, and sixty cameras. These lights and cameras may be mounted on poles, such as illustrated in FIGS. 6, and 7, or may be mounted in many other means and arrangements, including mobile arrangements, as well. Here we will continue to use the numbering system from FIGS. 6 and 7.

The impact of measuring the (x, y) position of the reflected artificial light in the heliostat mirror upon accuracy determinations can be highly significant. In the embodiment of the invention that operates without measuring (x, y) position, i.e. that operates by observing the heliostat array, and simply determining that, for example, for heliostat mirror (616), camera (604) can (or cannot) detect artificial light number (602), the system can already use standard geometrical optics to calculate the angle of heliostat mirror (616) to about a degree of precision. This is quite good, and already quite an improvement over the present art. However by going one step further, and additionally detecting exactly where in the (x, y) coordinate system of heliostat mirror (616) light (602) is appearing, the system can operate at almost 100× higher accuracy, thus providing heliostat angular data down to about $\frac{1}{100}$ of a degree.

Alternatively, this higher level of resolution can also be used to reduce the number of artificial light/camera systems needed to track the heliostat array, and thus help reduce system costs.

Although mounting cameras and artificial light sources on poles has been used as an example, it should be clear that many other configurations are possible and are keeping with the spirit of the invention. As previously discussed, as one alternative, the light sources (and or sensors) may be mounted on mobile platforms, such as rotating platforms, and these platforms moved over the heliostat field in a location versus time predictable manner.

Figure 8:
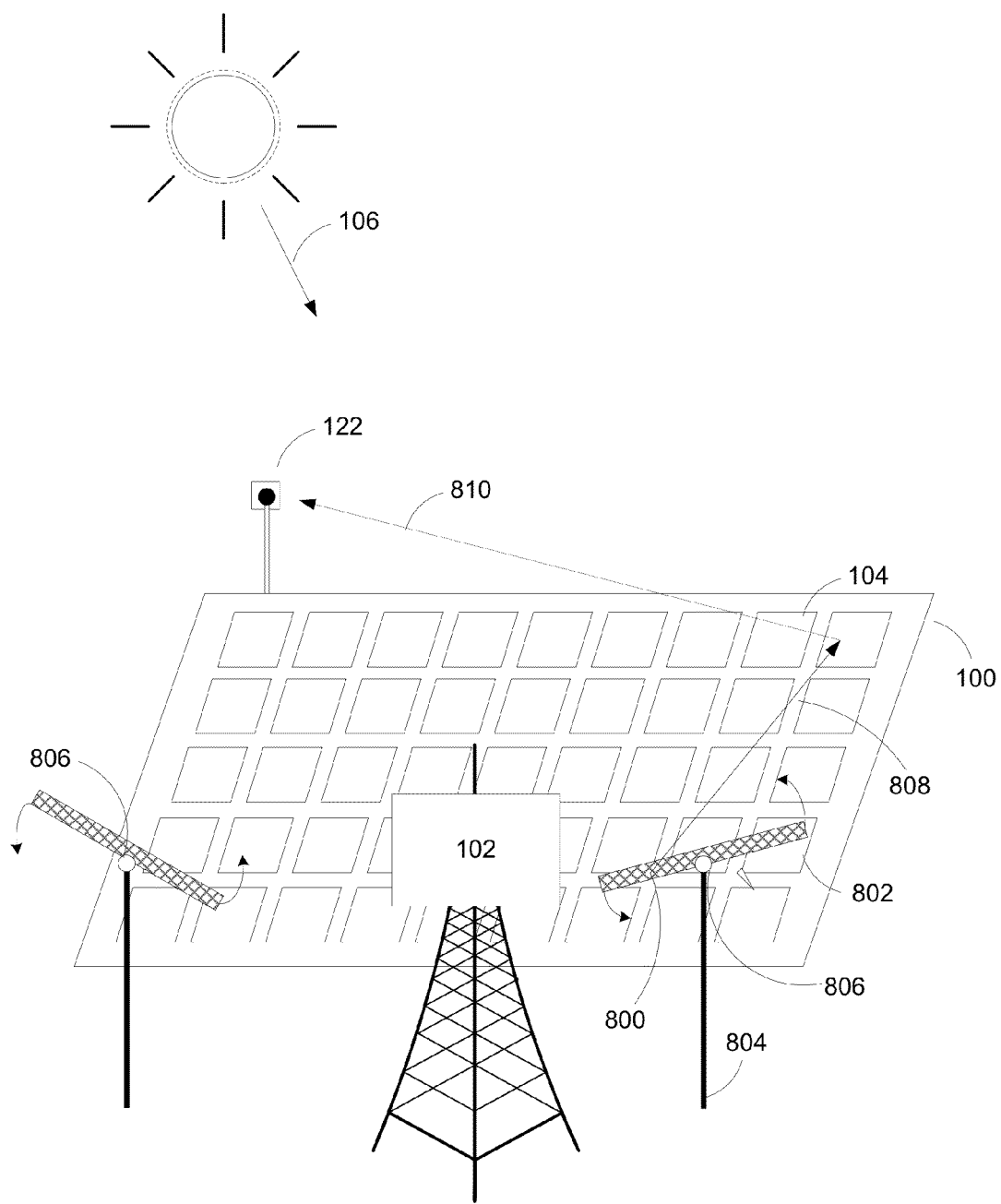
FIG. 8 illustrates an embodiment of the invention in which the artificial light sources are mounted on rotating bars, with the bar orientation determined by encoders, thus allowing the artificial light to scan over different portions of the heliostat mirror surface.

An example of this mobile light source or mobile sensor approach is shown in FIG. 8. Here one or more image capture devices (122), such as digital cameras, are again mounted in one or more locations in the heliostat array. However rather than putting the artificial light source near the camera, as was the case in the previous example, here the artificial light source is mobile. In this example, the artificial light sources (800) are mounted on the sides of a rotating beam (802) suspended above the heliostat field on a pole or support (804). Although the beam is rotating, the position of the light sources at any given time can still be precisely known by way of an encoder device (806) attached to the rotating beam, that can precisely determine the angle and position of the light source (800) on rotating beam (802) at any given time, and send this information to a computer or processor (410) (not shown).

The other operating methods of this embodiment are otherwise similar to the embodiment shown in FIGS. 6 and 7. As before, a beam of light (808) from the light source (800) impinges upon heliostat mirror (104), and the low intensity signal beam (810) reflected from heliostat (104) is captured by digital camera or sensor (122). This information is again fed into a computer or processor (410) (not shown). As before, using a digital camera system (122) that can determine the (x, y) position of the reflected light in the heliostat mirror is useful because it can allow heliostat angle measurements to be extremely accurate.

The advantage of the rotating beam approach is that because the light source is moving, this allows the reflected light to cover multiple regions of the heliostat of interest. Thus, for example, if the (x, y) location of the reflected light in the heliostat mirror is observed by the digital camera (122) as a function of time, the (x, y) reflected light coordinates will trace a pattern over the heliostat surface. This will help average out distortions and errors caused by irregularities in the heliostat surface, as well allow for sampling a much greater portion of the heliostat surface, which will result in even more accurate heliostat angle determinations.

Figure 9:
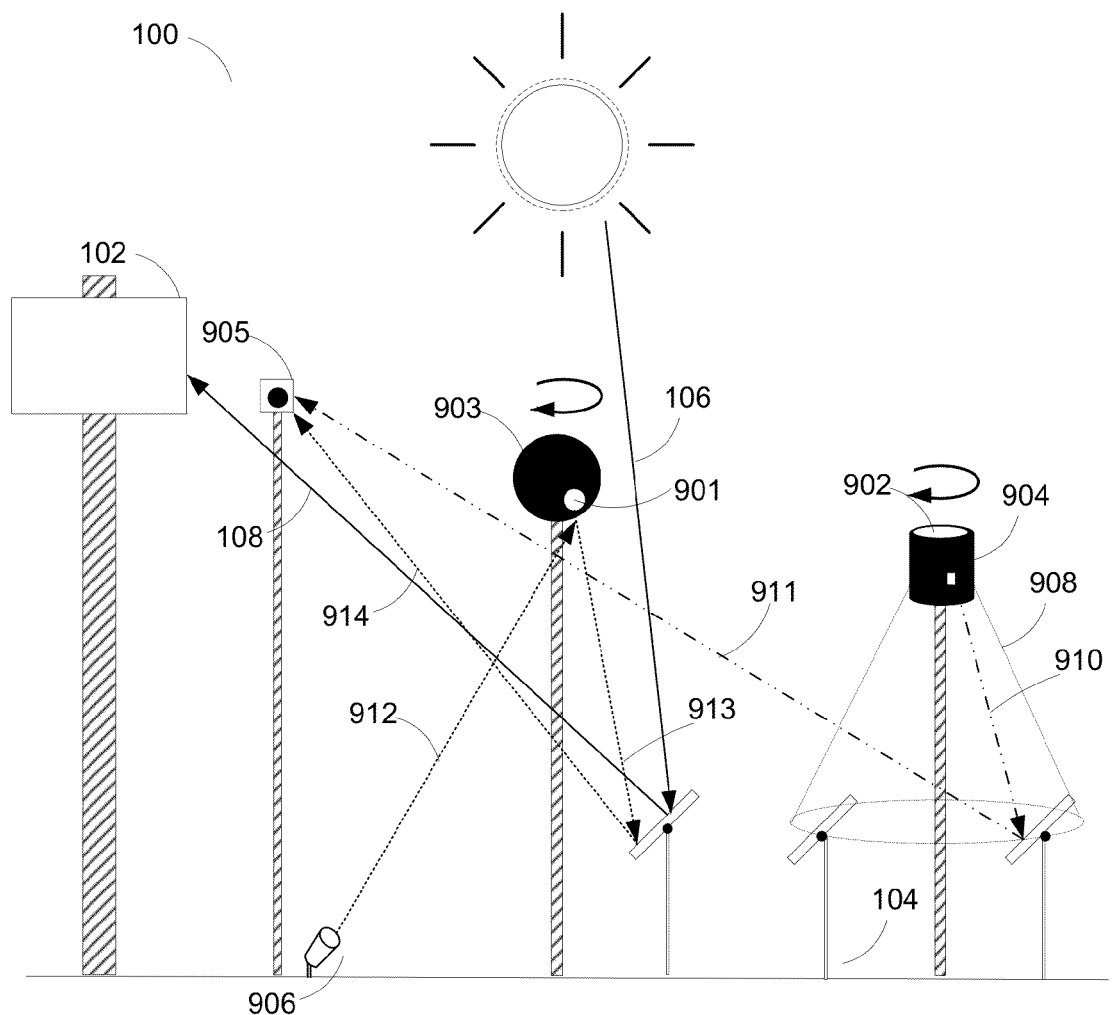
FIG. 9 illustrates an embodiment of the invention in which a reflecting element with a rotating mask is used to achieve a periodic signal beam which may be used to distinguish signal beams from main heliostat beams.

Whichever type of artificial light source is adopted for use, the key is that the intensity of the artificial light source is such that it can be observed by the digital cameras through the day inclusive of the brightest part of the day. In one or more embodiment of the invention the artificial light is replaced with a reflecting element which can be easily observed even when the sun is at its most intense point in the day. To assist with identifying the reflecting element a black cover may rotate around the reflecting element and thereby provide a blink rate the digital cameras can observe. If further intensity is needed to observe the reflecting element a light source can be directed on the reflecting element which in turn enhances the visibility of the reflecting element. An example of this approach is shown in FIG. 9.

One or more image capture devices (905), such as digital cameras, are again mounted in one or more locations in the heliostat array (100). One or more reflecting elements (901, 902) are located in a heliostat array (100). The reflecting elements may have a bright white surface or any other surface suitable for reflecting light. Reflecting elements may be mounted on a pole or other support. Rotating masking covers (903, 904) are configured to provide a blink rate the image capture devices (905) can observe. For example, a rotating masking cover (904) may be designed with a gap such light reaching reflecting element (902) is reflected as an oscillating beam (910). Mask covers (903, 904) may be designed to direct oscillating beams (910, 913), such as at an angle. For example, a rotating mask cover (904) may direct oscillating beam (910) over a conical path (908). Oscillating beams (910, 913) are reflected by heliostat mirrors (104) as periodic signal beams (911, 914). Periodic signal beams (911, 914) have a periodic blink rate determined by the rotation speed of the rotating mask covers (903, 904). Image capture devices (905) distinguish periodic signal beams (911, 914) from main heliostat beams (108) and incident sun light (106) based on the periodic nature of the periodic signal beams.

In another embodiment of the invention, artificial light sources (906) may be directed on a reflecting element (901). These artificial light sources may be collimated or omni-directional. These artificial light sources will often be light emitting diodes, incandescent light sources, fluorescent light sources, and the like. Although artificial light source (906) is shown fixed to the ground, one of ordinary skill in the art would appreciate that the artificial light source (906) may be attached to another surface. Although collimated artificial light sources such as lasers may be used, omni-directional light sources are also suitable for this embodiment.

What is claimed is:

1. A closed-loop tracking system comprising:
a plurality of heliostats, wherein each of the plurality of heliostats comprises a mirror configured to generate a main beam and an optical element configured to generate a signal beam at an angular offset from said main beam;
a receiver configured to concurrently receive the main beam from each one of the plurality of heliostat mirrors; and
a signal beam target to concurrently receive the signal beam from each one of the plurality of optical elements, wherein the signal beams from the plurality of optical elements are concurrently transmitted to and received by the signal beam target.

2. A closed-loop tracking system comprising:
a plurality of heliostat mirrors, each one of said plurality of heliostat mirrors configured to be correctly oriented in a position to reflect incident sunlight so that a main beam is directed onto a desired region of a receiver;
a plurality of optical elements for generating signal beams, each of the signal beams associated with an orientation position of one of said plurality of heliostat mirrors and being directed at an angle other than that of said main beam, said signal beams from said plurality of optical elements being concurrently directed to a target;
at least one optical sensor to read said concurrent signal beams at said target and to generate optical sensor data utilized to determine said orientation position of each of said plurality of heliostat mirrors; and
a heliostat mirror orientation apparatus coupled to each one of said plurality of heliostat mirrors, said heliostat mirror orientation apparatus configured to use said optical sensor data to control heliostat mirror orientation actuators on each one of said plurality of heliostat mirrors to orient a corresponding one of said plurality of heliostat mirrors.

3. The closed-loop tracking system of claim 2, further comprising a computer configured to take said optical sensor data as input and to control said mirror orientation actuators as output.

4. The closed-loop tracking system of claim 3, wherein said computer is configured to determine if heliostat mirror is at an optimal position by using solar angle data as determined either by a solar angle sensor or by at least time and date.

5. The closed-loop tracking system of claim 3, wherein said computer is configured to determine if a heliostat mirror is at an optimal position by using data that includes relative spatial locations of said heliostat mirror, said receiver, and said at least one optical sensor.

6. The closed-loop tracking system of claim 2, wherein each one of said plurality of optical elements is configured to produce a signal beam by transforming a fraction of said incident sunlight.

7. The closed-loop tracking system of claim 2, wherein each of said plurality of optical elements comprises an artificial light source configured to produce said signal beam by illuminating a corresponding heliostat mirror, causing said heliostat mirror to emit said signal beam at an angle offset from said main beam.

8. The closed-loop tracking system of claim 2, wherein each of said plurality of optical elements comprises an artificial collimated light source coupled to a corresponding heliostat mirror, said artificial collimated light source configured to produce said signal beam at an angle offset from said main beam.

9. The closed-loop tracking system of claim 1, wherein each one of said signal beams has unique characteristics identifying it to the corresponding one of said plurality of heliostat mirrors.

10. The closed-loop tracking system of claim 1, wherein each one of said signal beams has unique identification information encoded therein to identify it to the corresponding on of said plurality of heliostat mirrors.

11. The closed-loop tracking system of claim 9, further comprising an array of optical sensors configured to read said concurrent signal beams at said signal beam target.

12. The closed-loop tracking system of claim 11, wherein said array of optical sensors are coupled to said signal beam target.

13. The closed-loop tracking system of claim 11, wherein said array of optical sensors comprises one or more digital cameras located away from said signal beam target and directed towards said signal beam target.

14. The closed-loop tracking system of claim 11, further comprising one or more actuators coupled to each one of said plurality of heliostat mirrors, wherein each of said one or more actuators is configured to be capable of orienting said one of said plurality of heliostat mirrors to a desired angular position.

15. A closed-loop tracking system comprising:
a plurality of heliostat mirrors;
a plurality of signal mirrors, wherein each one of said plurality of signal mirrors is coupled to a corresponding one of said plurality of heliostat mirrors;
a receiver configured to receive a main beam of sunlight reflected from each one of said plurality of heliostat mirrors; and
a signal beam target to receive a signal beam from each one of said plurality of signal mirrors, wherein said signal beam is directed at an angle other than that of said main beam, wherein the signal beams from the plurality of signal mirrors are concurrently transmitted to and received by the signal beam target.

16. The closed-loop tracking system of claim 15, further comprising an array of optical sensors configured to read said concurrent signal beams from said plurality of signal mirrors at said signal beam target and generate optical sensor data.

17. The closed-loop tracking system of claim 16, further comprising a computer configured to take said optical sensor data as input and determine proper orientation of each one of said plurality of heliostat mirrors.

18. The closed-loop tracking system of claim 17, wherein said computer is configured to drive one or more actuators coupled to said each one of said plurality of heliostat mirrors to achieve said proper orientation.

19. The closed-loop tracking system of claim 16, wherein said array of optical sensors are coupled to said signal beam target.

20. The closed-loop tracking system of claim 16, wherein said array of optical sensors comprises one or more digital cameras located away from said signal beam target and directed towards said signal beam target.

* * * * *